United States Patent
Swann

(10) Patent No.: US 9,896,218 B2
(45) Date of Patent: *Feb. 20, 2018

(54) AIRCRAFT VAPOUR TRAIL CONTROL SYSTEM

(71) Applicant: ROLLS-ROYCE PLC, London (GB)

(72) Inventor: Peter Swann, Nottingham (GB)

(73) Assignee: ROLLS-ROYCE plc, London (GB)

(*) Notice: Subject to any disclaimer, the term of this patent is extended or adjusted under 35 U.S.C. 154(b) by 330 days.

This patent is subject to a terminal disclaimer.

(21) Appl. No.: 14/644,993

(22) Filed: Mar. 11, 2015

(65) Prior Publication Data

US 2015/0284103 A1    Oct. 8, 2015

(30) Foreign Application Priority Data

Apr. 2, 2014   (GB) .................................. 1405892.9

(51) Int. Cl.
*B64D 31/10* (2006.01)
*F02C 9/00* (2006.01)
*F02C 9/42* (2006.01)

(52) U.S. Cl.
CPC ............... *B64D 31/10* (2013.01); *F02C 9/00* (2013.01); *F02C 9/42* (2013.01); *F05D 2220/323* (2013.01); *F05D 2270/051* (2013.01); *F05D 2270/08* (2013.01); *F05D 2270/0831* (2013.01); *F05D 2270/13* (2013.01); *F05D 2270/335* (2013.01); *Y02T 50/671* (2013.01); *Y02T 50/677* (2013.01)

(58) Field of Classification Search
None
See application file for complete search history.

(56) References Cited

U.S. PATENT DOCUMENTS

| 3,310,949 A | * | 3/1967 | Pallis | F02C 9/42 |
| | | | | 60/243 |
| 9,399,521 B2 | * | 7/2016 | Swann | |
| 2005/0028513 A1 | | 2/2005 | Guillot-Salomon et al. | |
| 2007/0006593 A1 | | 1/2007 | Smith et al. | |
| 2008/0072577 A1 | | 3/2008 | Taylor et al. | |

(Continued)

FOREIGN PATENT DOCUMENTS

| WO | 93/06354 A1 | 4/1993 | |
| WO | WO 9306354 A1 | * 4/1993 | ................ F02C 9/28 |

OTHER PUBLICATIONS

Sep. 29, 2014 Search Report issued in United Kingdom Application No. GB1405892.9.

*Primary Examiner* — Abby Lin
*Assistant Examiner* — Paul Castro
(74) *Attorney, Agent, or Firm* — Oliff PLC

(57) ABSTRACT

The invention concerns an aircraft propulsion control system in which multiple gas turbine engines (10) are under the control of a controller (30). One or more sensor is arranged to sense a condition indicative of vapor trail formation by an exhaust flow from one or more of the engines. The controller (30) is arranged to be responsive to a thrust demand (51) for the aircraft and to control the thrust produced by each of the engines (10) concurrently so as to alter the efficiency of the engines upon sensing of the vapor trail formation condition, while satisfying the aircraft thrust demand. The controller (30) may output a separate throttle control signal (35) to each engine (10).

13 Claims, 6 Drawing Sheets

(56) References Cited

U.S. PATENT DOCUMENTS

2010/0122519 A1    5/2010  Epstein et al.
2010/0132330 A1*   6/2010  Noppel .................. F01D 25/30
                                                  60/39.5

* cited by examiner

AIRCRAFT VAPOUR TRAIL CONTROL SYSTEM

BACKGROUND OF THE INVENTION

The present invention relates to aircraft propulsion systems, and more particularly to control systems for aiding the prevention of contrail formation.

Contrails, also known as condensation trails or vapour trails, are line-shaped ice-clouds that appear behind aircraft under certain circumstances. The formation of a contrail depends on a number of factors, including: ambient temperature, humidity and pressure; the efficiency of the aircraft's engines; and the properties of the fuel burned in the engines.

The term "contrail factor" is used to refer to the gradient of a line representing the mixing of engine exhaust air with ambient air, when plotted on a chart using water-vapour partial pressure as the y-axis and temperature as the x-axis. A reduction in an engine's contrail factor reduces the range of ambient conditions under which the engine can form a contrail. Alternatively, at a particular ambient condition (characterised by pressure, temperature and humidity), a reduction in contrail factor may allow a transition from formation of a contrail to non-formation of a contrail.

A contrail, once formed, will typically dissipate within a minute or so, unless the ambient air is supersaturated with respect to ice, in which case the contrail may persist. A persistent contrail will grow over time to resemble natural cirrus cloud, both in size and optical properties, and is referred to as "contrail-cirrus". Line-shaped contrails and contrail-cirrus are collectively referred to as "aviation-induced cloudiness" (AIC). Contrail-cirrus is thought to cause a majority of the climate impact of AIC due to it being spatially larger and longer-lived than non-persistent line-shaped contrails.

Depending on the metric employed, the climate-warming impact of aviation-induced cloudiness may be of a similar magnitude to that of the $CO_2$ emitted by aircraft, and may therefore represent a significant element of aviation's total climate impact. The suppression of contrail formation, and particularly the suppression of persistent contrails, therefore represents a compelling opportunity for a significant reduction in the overall climate warming impact of aviation.

However a number of potential techniques for reduction of contrail formation by a gas turbine engine require the use of bespoke equipment and/or materials that are additional to those required for conventional engine operation. Any weight and/or energy penalties incurred in order to achieve contrail suppression require careful scrutiny to determine whether such penalties outweigh the possible contrail reduction benefits on climate impact.

Another method of potentially reducing the negative impact of contrail formation is to route aircraft around/above/below regions of air susceptible to contrail formation and/or persistence. However, in addition to the added complexity for air traffic control and pilots, the re-routing of aircraft away from predetermined flight paths will cause increased fuel burn, not only by increasing duration and distance traveled, but also by causing departure from optimal cruise conditions of the aircraft engines.

It is therefore an object of the present invention to manage the formation of contrails by aircraft engines in a manner that reduces negative impact on the climate. It may be considered an additional or alternative aim to provide a system for aircraft engine contrail suppression which bears minimal weight or material penalty.

BRIEF SUMMARY OF THE INVENTION

According to a first aspect of the invention there is provided an aircraft propulsion control system comprising: a plurality of gas turbine engines; one or more sensor arranged to sense a condition indicative of vapour trail formation by the exhaust flow from one or more of the plurality of engines; and a controller arranged to be responsive to a thrust demand for the aircraft and to control the thrust produced by each of the engines so as to alter the efficiency of one or more of the engines upon sensing of said condition by the one or more sensor.

The controller may independently control the thrust produced by each engine. The controller may instruct one or more engine to generate a different level of thrust to one or more further engine, e.g. concurrently.

The controller may control the plurality of engines such that the total thrust produced by said plurality of engines satisfies or equals the aircraft thrust demand. The controller may control the plurality of engines such that one or more engine contributes a different proportion of the total thrust from one or more further engine, e.g. concurrently.

The controller may control one or more operational variable which impacts the thrust produced by each engine. The operational variable may correspond to or display a known/direct relationship with thrust, for example such that the operational variable provides an indicator of, or proxy for, thrust. The controller may receive or control one or more throttle setting for each engine, e.g. to vary thrust independently and/or concurrently for each engine.

The controller may output an independent or individual control signal to each engine, e.g. concurrently, for control of the operational variable.

The controller may receive or determine a current or optimal-efficiency thrust value for the plurality of engines and may alter the thrust of each of the plurality of engines away from said current or optimal-efficiency thrust value, e.g. in response to sensing of the vapour trail formation condition. The controller may increase the thrust contribution of one or more engine to a value greater than said current, predetermined or optimal-efficiency value and/or may decrease the thrust contribution of one or more further engine to a value lower than said current, predetermined or optimal-efficiency value. The thrust contribution of a first subset of the plurality of engines may be increased, whilst the thrust contribution of a second subset of the plurality of engines may be decreased.

A summation of the concurrent positive and negative changes to the thrust contribution from each engine on the aircraft may equal zero.

The controller may vary the thrust produced by each engine such that the thrust contribution by one or more engine on opposing sides of a central axis or plane of the aircraft is within a predetermined thrust threshold or thrust difference threshold. A thrust asymmetry threshold may be predetermined or calculated by the controller. The controller may vary the thrust produced by each engine such that a thrust asymmetry arising from the thrust contribution by one or more engine on opposing sides of a central axis or plane of the aircraft is within the predetermined or calculated thrust asymmetry threshold.

The controller may vary the thrust produced by each engine so as to balance the thrust contribution by one or more engine on opposing sides of the aircraft.

The invention beneficially allows the efficiency of the engines to be reduced in order to reduce the instantaneous contrail factor for the engine, whilst ensuring that the aircraft thrust requirements are met.

The controller may be arranged to determine a maximum available variation in thrust value and/or engine efficiency available for each of the plurality of engines, and an efficiency value and/or range of values required to prevent contrail formation. The controller may be arranged to alter thrust levels and/or engine efficiency only if it is determined that contrail suppression can be achieved thereby. Although engine efficiency exerts a relatively weak effect on contrail formation, it has been found that this effect beneficially provides sufficient scope under certain conditions to enable an aircraft to remain contrail-free at its current/desired flight-level, for example whilst traversing a region of ice-supersaturated air, rather than needing to descend or climb a full 1000 ft or 2000 ft to the next available flight-level, which may correspond to a materially less fuel-efficient cruising altitude. Thus the invention may beneficially reduce the need to alter other aspects of engine operation and/or flight path to mitigate against contrail formation.

The controller may access one or more engine efficiency model for the plurality of engines, which may comprise an engine efficiency plot, curve, formula, look-up table, database or the like. The controller may determine a new thrust/throttle value for each engine in dependence on the engine efficiency model. An engine efficiency model may be determined or provided for each of the plurality of engines. An engine efficiency model may comprise a deviation from a standard or normal model for each of the engines.

The controller may determine a desired engine efficiency decrease for each engine and may determine a thrust/throttle change required to achieve said efficiency decrease, for example based upon the engine efficiency model.

The controller may undertake a search process to identify a value of thrust, efficiency or throttle for each engine which satisfies a threshold or target value of a contrail characteristic for one or more engine. The threshold may be a zero (e.g. being indicative of no contrail formation) or non-zero value.

The controller may undertake a search process to identify a value of thrust or throttle which satisfies a threshold value of contrail characteristic with greatest efficiency, or minimum fuel consumption or efficiency degradation, e.g. across all the engines on the aircraft.

The search process may comprise an iterative search process, for example to converge on an optimal solution. The controller may perform an analytical/mathematical search, for example according to a model of engine efficiency and/or a correlation between engine thrust/throttle and contrail formation. Additionally or alternatively, the controller may undertake a search of trial values by instructing changes in values for one or more of the plurality of engines and determining the resulting impact on the vapour trail formation and/or engine efficiency, e.g. according to sensor readings.

The search process may comprise setting boundaries of one or more operational variable, within which the search is to be performed.

The sensor may comprise one or more sensor for detecting actual or implied contrail formation. The sensor may or may not comprise one or more ambient condition sensor. The sensor may or may not comprise an engine operating condition sensor. The sensor may or may not comprise a contrail detection sensor, such as, for example an optical depth or acoustic sensor (e.g. a wave emitter/receiver).

The sensor may comprise one or more of an ambient temperature, pressure, light and/or humidity sensor. The sensor may or may not comprise an altitude sensor. One or more threshold value of a sensor reading may be used to control initiation/cessation of engine thrust control according to the invention. The controller may be arranged to vary the thrust level of each engine, e.g. away from its current, predetermined and/or optimal-efficiency thrust value, only in response to detected or implied contrail formation in a region of ice-super-saturated air and/or at night.

The controller may be arranged to control the thrust produced by each of the engines according to the invention only in predetermined portions or phases of a flight, for example during cruise. In other phases/portions, the controller may not modify the signals away from their respective current, predetermined and/or optimal efficiency thrust values, for example such that there is a uniform distribution of thrust across all the engines. One or more sensor may be used to determine the flight portion or phase. The one or more portion or phase may be identified according to altitude (or location) and/or engine operating point.

In examples of the invention, the controller may be arranged to receive a signal indicative of the level/volume of fuel aboard the aircraft. The system may comprise one or more fuel sensor. The controller may be arranged to determine whether or not to modify the thrust produced by each engine in dependence upon the fuel sensor output (e.g. based upon a fuel consumption requirement calculation for a remainder of the flight). The controller may initiate or cease variation of the thrust produced by each engine away from a normal/predetermined/optimal thrust setting in dependence upon said signal.

The controller typically comprises machine readable instructions, such as one or more module of code and/or control algorithm, for control of engine thrust with the aim of suppressing contrail formation from the engine.

According to a second aspect of the invention, there is provided a data carrier comprising machine readable instructions for operation of a controller of an engine control system in accordance with the first aspect. The data carrier may comprise a persistent memory or data carrier device.

According to a third aspect of the invention, there is provided a method of controlling one or more aircraft engine in accordance with the control system of the first aspect.

Any of the optional or preferable features defined in relation to the first aspect may be applied to the second or third aspect.

BRIEF DESCRIPTION OF THE DRAWINGS

Practicable embodiments of the invention are described in further detail below by way of example only with reference to the accompanying drawings, of which.

DETAILED DESCRIPTION OF THE INVENTION

In essence this invention achieves a contrail suppression effect by selectively altering the total efficiency of each engine, thus decreasing the threshold ambient temperature below which a contrail can form, at a given level of ambient humidity. That is to say, when contrail suppression is operative, the contrail formation requires colder ambient air and so takes place under a smaller range of circumstances. The invention may thus act to selectively reduce the contrail factor for the engine.

In varying the total efficiency of each engine, the thrust produced by each engine is varied and so the invention relies on varying the thrust distribution across a plurality of propulsive engines of an aircraft in order to ensure a total aircraft thrust requirement is met. An aircraft having two, three, four or more engines can be accommodated by the invention.

In the examples defined below, a 'cost' parameter or associated function is used for assessment of a contrail suppression mechanism comprising the proposed distribution of thrust between the plurality of engines, in which one or more than one or each of the plurality of engines is required to operate at a thrust level which differs from its current, predetermined and/or optimal-efficiency thrust level. It is important to note that such a 'cost' need not link to financial cost but is instead used as an operational cost or penalty. Such an operational cost parameter could include consideration of, for example, any or any combination of changes in the rate of fuel consumption, changes in the rate of emissions of carbon dioxide or other engine exhaust gases, changes in the formation of contrails, changes in the maintenance cost per unit time of engine operation, or other operational factors. Financial cost could also be one factor in assessing operational cost but it is not intended that the cost parameter referred to herein is so limited. The cost function may be the same or different for each engine on an aircraft. The cost function is typically specific to the current operating conditions, where "operating conditions" includes the ambient conditions (temperature, pressure, humidity) and the engine operating point (total-efficiency, throttle-setting, exhaust temperature, etc).

Figure 1:
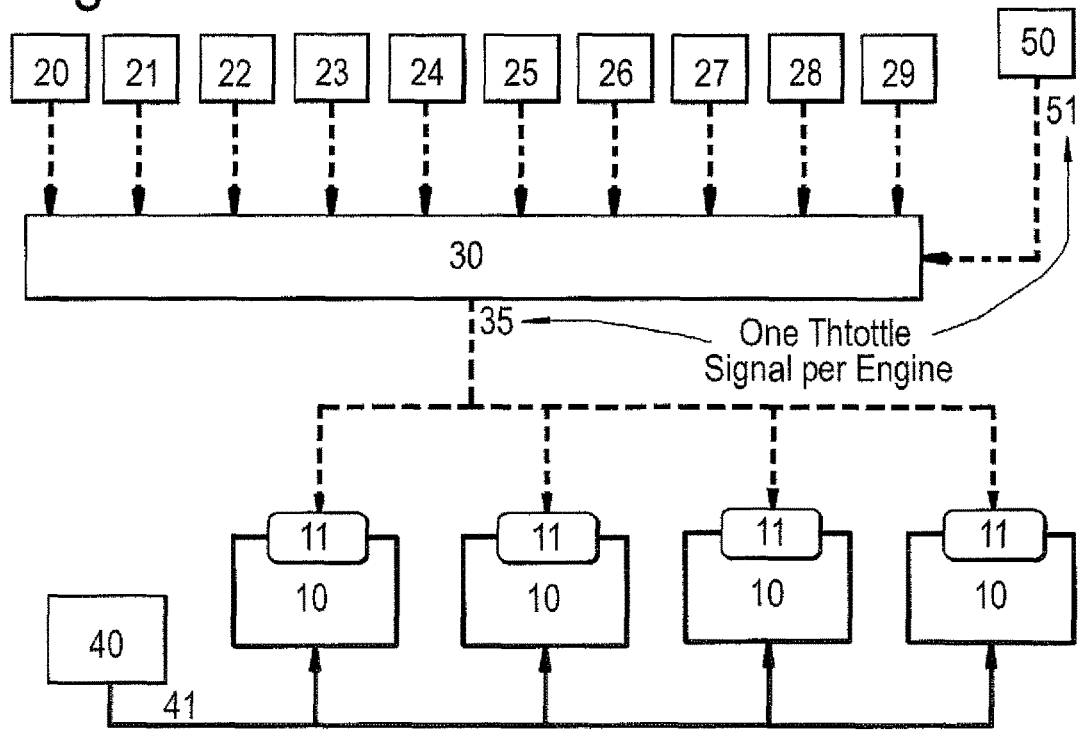
FIG. 1 is a diagrammatic representation of a control system according to a first example of the invention.

Turning to FIG. 1, there is shown one arrangement of a control system according to the invention for coordinating thrust distribution over a plurality of engines so as to provide contrail suppression. Dashed lines are used to indicate signals between the relevant system components. Any reference to a 'model' made herein is a reference to a data/information source defining impact on one or more variable with variation of one or more further variable. Such models may comprise one or more database, lookup table, chart or computational model (e.g. comprising one or more algorithm or mathematical formula) as required.

An ambient condition sensor array 20 is arranged to output real-time or near-real-time information concerning the ambient pressure, temperature, light level and/or humidity of air through which the aircraft is flying. In another example, one or more of those sensors 20 may optionally be replaced and/or supplemented by a database of forecast data (e.g. obtained prior to the flight and/or updated periodically during the flight via radio-link or similar) which details the ambient condition(s) that the flight will encounter along its proposed flight routing and altitude profile, taking account of the expected time at which each point of the proposed route will be passed. Depending on the different embodiments of the invention, only one or a subset of the above ambient conditions may be used.

21 is a representation of a deployment policy or contrail suppression policy. The policy allows prioritisation of the control system to achieve greatest beneficial climate impact. That is to say the policy determines how best the invention should be employed to ensure that any increased fuel burn due to reduction of engine efficiency is outweighed by the beneficial impact of contrail suppression. Example deployment policy criteria and decision making processes are discussed below.

22 is a source or sources of data from which can be measured or calculated the engine's total efficiency $\eta$ at the current conditions. Examples might include sensors for fuel-flow rate into the engine and speed of the aircraft through the surrounding air.

23 is a model from which can be obtained information describing the variation in engine total efficiency due to changes in thrust level. Recorded (e.g. current or historic) data on specific fuel consumption (SFC) for each engine in their current operating state (e.g. from previous flights), such as so-called SFC loops could be used. In another example, which is simpler to implement but generally of less preferable functionality, a standard engine efficiency plot or model for that engine type could be used.

24 is a further model detailing the relationship between throttle setting and thrust level resulting from that throttle setting for an engine, given the engine's current operating point. In the context of the current invention the engine operating point can be interpreted to mean engine total efficiency, $\eta$, but more generally it takes account of many parameters such as shaft speeds, pressures and/or temperatures at various points throughout the engine as well as any control settings that affect engine operation, such as bleed settings, power off-take settings etc.

25 represents an engine operation sensor, or a collection of sensors, or one or more other data source from which can be obtained any of the operational variable values required for interrogation of any of the database(s), lookup table(s) or computational model(s) described herein, including any or any combination of engine settings or operational parameters. Operation variables such as altitude, air speed, current engine bleed settings, and/or current shaft power-offtake settings may be used.

26 represents one or more database of any other predetermined or stored data necessary for performing a determination according to the invention, such as the specific heat capacity of air at constant pressure $C_p$, and the ratio $\epsilon$ of the molar masses of water and air, or the like. Generally, parameters or parameter relationships that do not vary significantly as a result of engine operation will be stored here.

27 is a model or other source of information from which can be obtained details of the expected fuel-efficiency penalty associated with aircraft operational adjustments required to compensate for a given level of thrust asymmetry produced by the engines. Such an efficiency penalty may be attributed, for example, to trim and/or rudder adjustments to counteract any thrust imbalance by the engines relative to an aerodynamic centreline of the aircraft, e.g. taking into account the extent to which the installed engines are laterally offset from the aircraft centreline and/or from each other. 27 may also incorporate a source of information concerning any hard limits (whether driven by commercial policy or by safety regulation) on thrust asymmetry which must not be exceeded.

28 represents an optional lookup-table, database or computational model from which can be obtained estimates or detailed calculations of any likely impact upon maintenance cost or schedule related to operating an engine at a higher-than normal or lower-than-normal thrust setting during the period of contrail-suppression.

29 is a lookup-table, database or computational model from which can be obtained the environmental penalty of contrail formation given the current ambient and/or engine operation conditions. The penalty parameter varies in relation to one or more contrail characteristic and allows a representation of the balance between minimising fuel-burn on the one hand and minimising contrail climate impact on the other hand. If a contrail does not form under a particular set of conditions then the penalty calculated for those conditions would for example take a value of zero. If a non-persistent contrail forms the penalty would take for example a medium value, and if a persistent contrail forms the penalty would take for example a high value. Ambient temperature and/or the time of day (e.g. allowing distinction between contrails existing during daytime and night time) may contribute to the penalty determination. In one example, the penalty could additionally or alternatively relate to a financial cost/penalty.

30 is the decision making unit central to the present invention. The decision making unit 30 comprises one or more controller arranged to co-ordinate the thrust between the engines 10 in accordance with the invention.

Each of the plurality of engines 10 draw fuel from a fuel source 40 via a fuel line 41, under the control of an engine control unit 11. In this example, the controller 30 is common to a plurality of engines on the aircraft so as to coordinate contrail suppression for the aircraft as a whole. Thus controller 30 is in communication with, and can instruct a suitable operational variable, such as a throttle setting, for each engine control unit 11 either individually or collectively. The local engine control unit 11 on each engine then instructs or controls the engine operational variable values in accordance with the instruction by the controller 30.

50 represents central or cockpit control systems for the aircraft, thus dictating the aircraft propulsion requirements. The propulsion requirement output by 50 takes the form of a control signal 51 representative of the total thrust requirement of the aircraft and/or a thrust/throttle setting for each engine 10. Typically the control signal 51 will comprise a plurality of thrust signals corresponding to the position of a plurality of throttle controls, e.g. levers, within the cockpit. Signal 51 typically comprises a throttle setting for each engine which will be substantially equal in normal operating conditions.

The controller 30 receives signal 51 and determines, according to contrail suppression requirements, whether, in which direction, and by what extent, to alter the thrust contribution of each engine by adjusting each engine's throttle setting away from the setting stipulated in signal 51. The controller thus outputs a resulting throttle control signal 35, comprising an individual thrust setting for each engine 10, which may selectively depart from the thrust settings instructed by signal 51 received from the cockpit.

The controller 30 preferably only applies contrail suppression control in accordance with the invention in a selective manner. That is to say, the controller 30 will acknowledge whether a higher level demand on the aircraft thrust will override any contrail suppression attempt. This may form part of a contrail suppression policy but may otherwise be enacted by inhibiting contrail suppression control by controller 30 during certain portions of a flight, such as take-off, climb out, descent/approach or else during other maneuvers for which thrust control is paramount. One or more altitude sensor, engine operating point or operating condition sensor may be used to distinguish between scenarios or flight portions in which contrail suppression should/should not be attempted.

Figure 5:
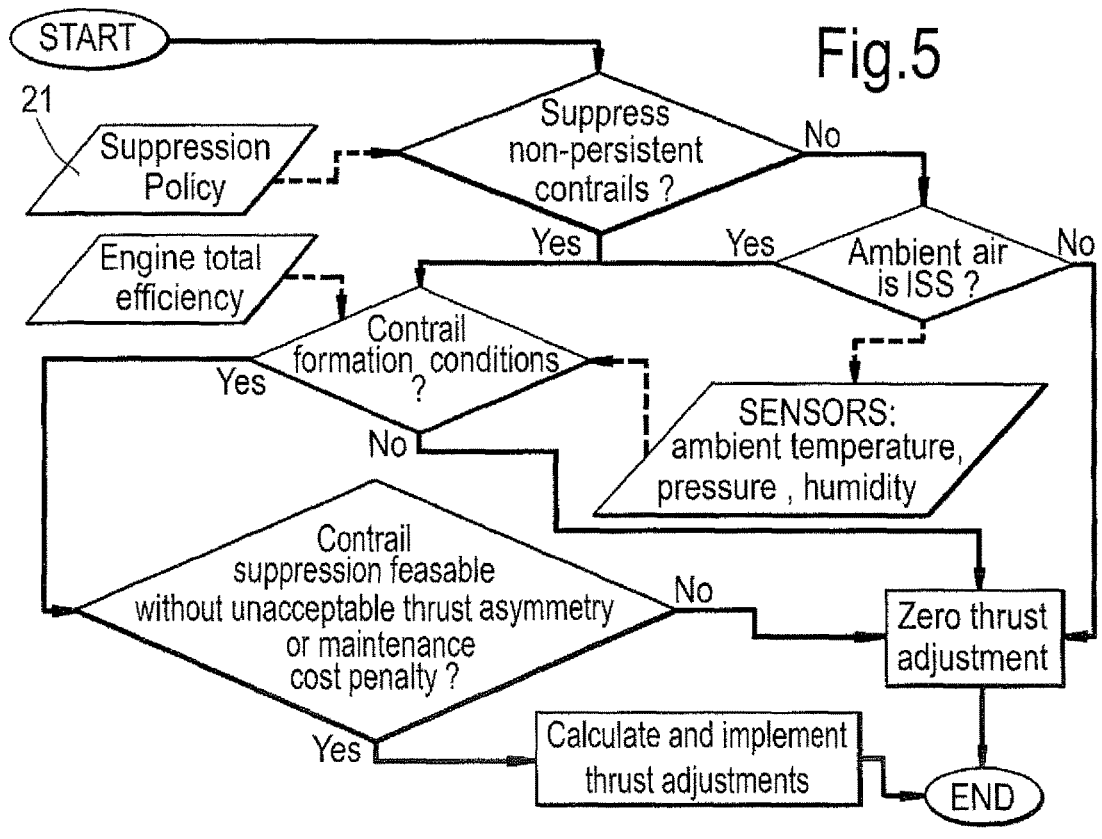
FIG. 5 is a flow diagram of a control process for contrail suppression according to one example of the invention.

Turning now to FIG. 5 there is shown a decision-making process for determining whether control steps are required to mitigate against contrail formation and the resulting control changes for each of the engines 10. Although not shown in FIG. 5, the control system may operate a primary loop to check whether the operating conditions (i.e. the ambient conditions and/or engine operation parameters) have changed materially since a previous iteration. If there has been no such change, then no further decision making is required until such a material change occurs. The operating conditions could comprise any, or any combination of, ambient temperature, ambient pressure, ambient humidity, altitude, and/or engine throttle setting or settings commanded by the cockpit or engine operating point.

Current operating conditions may be stored at each iteration such that the next iteration can compare current operating conditions against one or more recorded set of previous operating conditions. Alternatively, current operating conditions are stored during the first iteration of the primary loop and thereafter only when a material change to the operating conditions is detected relative to the previously stored value. In any example, a log of one or more previous operating condition is maintained to allow comparison with current or most recently sensed conditions.

The controller accesses deployment policy 21 to determine whether or not contrail suppression is to be attempted, such as according to a contrail characteristic. The deployment policy is preferably predetermined based on an assessment for a range of contrail characteristic values either or both of:

the climate warming impact of the contrail, if formed any cost penalty associated with the contrail, if formed The assessment of climate warming impact would primarily take into account one or more of the following factors: likelihood of contrail persistence; the balance between day-time and night-time over the contrail life; the temperature of the ambient air in which the contrail will reside. During the day, contrails reflect a proportion of incoming sunlight away, leading to a climate cooling effect which is at least partially offset against the climate-warming impact associated with the absorption by contrails of heat radiating upward from the planet's surface. During the night, however, the cooling effect is not operative. For this reason a contrail's climate warming impact (per unit time of contrail existence) is typically greater during the night than during the day. It is estimated that, globally, night-time flying accounts for some 40% of total flying miles, but for some 60% of aviation's total contrail-related climate warming impact. The climate warming impact of a contrail is also influenced by its temperature such that a contrail forming in colder air will exert more of a climate warming effect than an equivalent contrail that forms in slightly warmer air.

In order to best offset any additional fuel burned under the invention, it is proposed that contrail suppression could operate only when contrail persistence is possible e.g. according to sensing that ambient air is ice supersaturated (ISS), and/or during the night. However various different sub-sets of all contrails may be selected in order to offer a different balance between the system variables and, accordingly the policy may take into account any one or more of the above-discussed conditions/parameters. Based on these factors, a predetermined decision on the contrail characteristics for which the invention should be deployed in an effort to suppress the contrail's formation is made. Example deployment policies could be based upon:
  a) Estimating a climate warming impact of the contrail if allowed to form, and applying a threshold below which contrail-suppression will not be attempted
  b) As a) but assessing the reduction in climate warming impact that can be achieved by this invention per extra unit mass/weight of fuel burned.
  c) As b) but assessing the contrail-related cost benefit due to the reduction in warming impact against a corresponding threshold/margin, which could be tailored according to the aircraft operator's climate view
  d) Alternatively, employing one or more pre-determined deployment rule based on a contrail characteristic or ambient condition.

For instance, it may or may not be considered appropriate to only use this invention when contrails persist, e.g. if ambient relative humidity over ice is 100% or greater. Additionally or alternatively, the decision to use or not to use this invention to modify contrail properties may be informed by other factors such as the ambient temperature and/or the strength of incoming sunlight incident upon the formed contrail. For example, it may be deemed appropriate to attempt to ameliorate only contrails which are both persistent and existing primarily during the night-time. Such additional decision criteria would avoid the need to suppress contrails that do not bear a significant climate-warming impact.

An assessment of whether or not a particular contrail characteristic would warrant suppression steps is undertaken by checking whether one or more ambient sensor reading and/or engine operation parameter achieve a threshold level set by the contrail suppression policy. In the example of FIG. 5, if only persistent contrails are to be mitigated against, then a check of whether ambient air is super saturated with respect to ice is performed.

In one example, a vapour trail detection sensor may be used to trigger contrail suppression action and/or to verify a determination of the presence or absence of a contrail. A suitable sensor may comprise an optical depth sensor. A source of illumination may also be provided on the aircraft and directed towards at least one region downstream of the engines to illuminate at least part of the field of view of the optical depth sensor. The sensor would be configured to detect electromagnetic radiation of at least one wavelength emitted and/or reflected by the vapour trail in response to energy emitted from the source of illumination. In other embodiments, instead of illumination, an emitter of sound (or ultrasonic) waves could be provided. The sensor would then be configured to detect the sound returned from the ice particles in the young contrail. Such a sensor may be considered an example of one of the ambient sensors 20 described above. Additionally or alternatively, readings from ambient sensors for temperature, pressure and/or humidity may be used to infer whether a contrail is forming with or without verification by a specific contrail detection sensor. Such inference will take account of engine efficiency at the current operating conditions, and the properties of the fuel being used.

If it is determined that a contrail is being formed and that the contrail suppression policy requirement(s) is/are met, then the controller 30 determines whether contrail suppression is achievable under the available scope for modification of individual engine throttle settings. If contrail suppression would not be achieved for any of the engines even at a maximum permissible engine thrust adjustment, then no contrail suppression control is applied by way of the invention and zero thrust adjustment is made by controller 30 to the cockpit-commanded throttle signals 51. If contrail suppression is within the scope of control of controller 30, then the throttle adjustments for the engines are determined by controller 30 and implemented as will be described further below.

Figure 6:
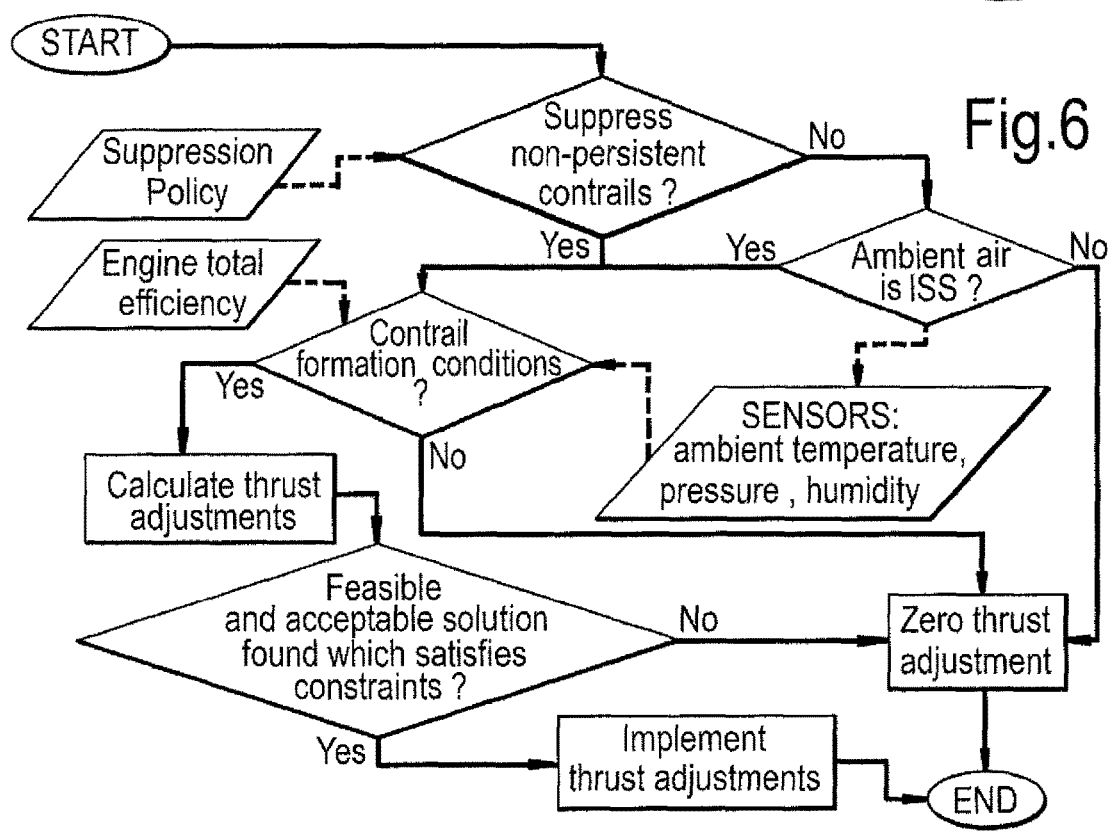
FIG. 6 is a flow diagram of a control process for contrail suppression according to another example of the invention.

The example of FIG. 6 is similar to that of FIG. 5 with the exception that the determination of whether or not contrail suppression is achievable under the system constraints may be made during calculation of engine thrust/throttle adjustments that would satisfy one or more contrail suppression criterion.

With reference to FIGS. 7 to 11, there are described methods for determining changes to the thrust produced by each individual engine on the aircraft for scenarios in which controller 30 performs contrail suppression steps. In these examples, the engine throttle setting is used to control thrust. This approach requires no, or minimal, change to conventional engine design and thus allows contrail suppression steps to be taken merely by modifying the manner in which a plurality of engines are controlled.

Figure 7:
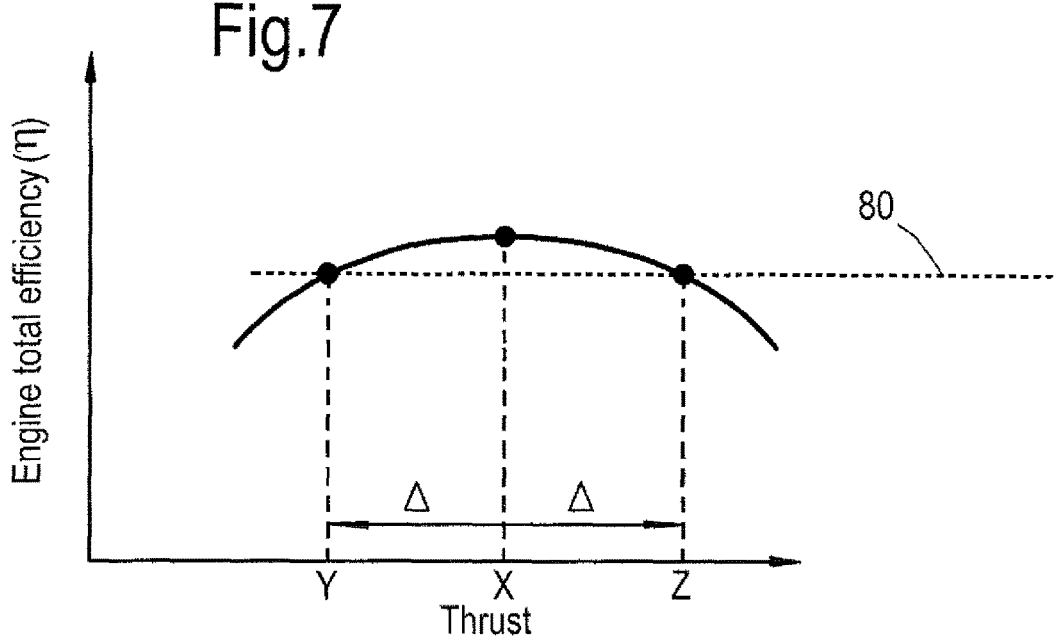
FIG. 7 shows a schematic plot of engine efficiency against thrust for use in determining engine thrust settings in accordance with the invention.

Turning to FIG. 7, a schematic plot of the engine total efficiency, $\eta$, against thrust (i.e. net thrust) is shown. An engine is conventionally operated such that the thrust value, x, at cruise conditions lies at or in the vicinity of the maximum achievable engine efficiency. The efficiency typically reduces in a generally non-linear manner either side of the peak value. In conventional engines, a change in efficiency $\eta$ of a few percent can be achieved through acceptable changes in thrust setting.

Line 80 in FIG. 7 represents a value of efficiency, $\eta$, at or below which contrails will be suppressed at the given ambient conditions. Thus, when operating at thrust value x, i.e. at normal cruise conditions, the engine represented in FIG. 7 would result in contrail formation. However, if the thrust is modified to value Y or Z by decreasing or increasing thrust respectively, then the resulting change in engine efficiency would inhibit contrail formation for the given ambient conditions.

Clearly, altering the thrust setting of an individual engine has an impact on aircraft propulsion and so, by co-ordinating the thrust change across a number of engines on the aircraft, with some being set to an increased thrust level, and some to a decreased thrust level, a reduction in engine efficiency across all the engines can be achieved without altering the total thrust provided to the airframe. As a simple example, for a four engine aircraft with all engines initially operating at optimal efficiency thrust values (x, x, x, x), the thrust settings would be changed to (x+$\Delta$, x−$\Delta$, x−$\Delta$, x+$\Delta$), or (Z, Y, Y, Z). In the simple example above, the alteration of thrust introduces no thrust asymmetry. For a three-engined aircraft, the thrust settings (x, x, x) could be altered to (x+Δ, x−2Δ, x+Δ), again with no thrust asymmetry. For a twin-engine aircraft, the thrust asymmetry required to maintain the desired total thrust for the aircraft may need to be managed. For example rudder settings for the aircraft may need to be adjusted in order to ensure the intended aircraft trajectory.

For civil aviation it is a certification requirement that a twin-engine aircraft must be able to cruise with only one engine (i.e. with the second engine providing zero thrust). Accordingly it is feasible that the invention could generate up to a similar level of thrust asymmetry at least for the limited duration in which contrail suppression is required. However the potential maintenance and engine/airframe health implications of such operation for extended periods of use may lead to an operational limit of thrust asymmetry being established in order to provide a balance between ongoing equipment health and contrail suppression.

In any example of the invention, a thrust asymmetry upper limit may be used to limit the scope/magnitude of thrust changes that can be made to any individual engine. In one example, it is possible that the controller could switch higher and lower thrust settings between different engines for different/consecutive instances of contrail suppression. A log of prior engine thrust settings and/or durations may be maintained to ensure the thrust variation for each engine generally balances over time.

For wing-mounted twin-engine configuration, the above problems are most pronounced but for twin-engines mounted on the fuselage or otherwise close to the aircraft centreline, the problems are lessened and it may be that the thrust asymmetry does not pose a significant operational issue.

Figure 8:
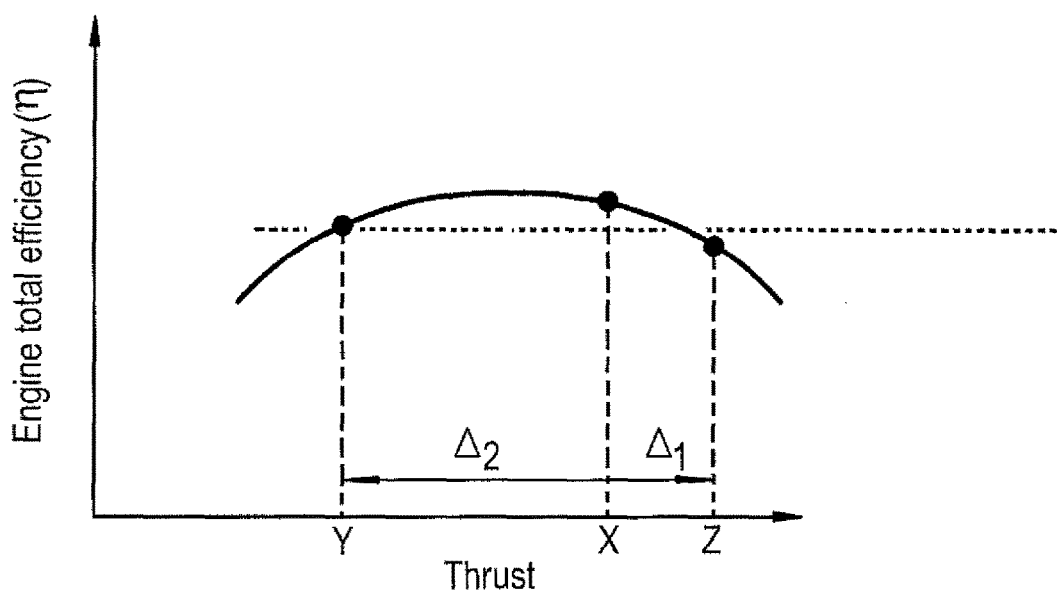
FIG. 8 shows the plot of FIG. 7 with a different operation scenario.

Turning to FIG. 8, another example is shown in which the engines are not operating at an optimal efficiency setting when contrail suppression is required. In such an example, it is possible to use unequal engine numbers in each subset (e.g. having one engine in one subset and n−1 engines in the other subset). This would enable the thrust for the/each engine in one subset to be reduced substantially, past the optimum thrust point, to the contrail suppression point Y on the other side of optimum, while the thrust of the/each engine in the second subset is raised by a smaller magnitude to the contrail suppression point Z. To ensure total thrust remains unchanged, it may be necessary to amend the thrust of one of the subsets to a position beyond the onset of contrail suppression. FIG. 8 illustrates a case where the larger subset is over-adjusted at point Z, but it is likely that in some cases the over-adjustment of the smaller subset could be preferable in terms of minimising the overall fuel-burn penalty. In examples where the current operating point X is below, rather than above, the optimal efficiency value, corresponding but opposite increases/decreases will be made.

As an alternative to thrust changes proposed in FIG. 8 for a scenario in which the engines are not operating at an optimal efficiency setting when contrail suppression is required, another mode of operation may involve implementing corresponding increases and decreases in thrust level, Δ, on different engines or engine subsets of equal magnitude. Thus the overall SFC penalty incurred at this condition will be reduced (possibly to zero), but contrail suppression will be limited to one or one subset (e.g. half) the installed engines. In such a scenario it may be beneficial to select the inboard engines as the contrail producing engines, since they will offer increased likelihood of merging of the contrails downstream, thereby lessening spreading of the contrails and any associated climate warming impact.

Figure 9:
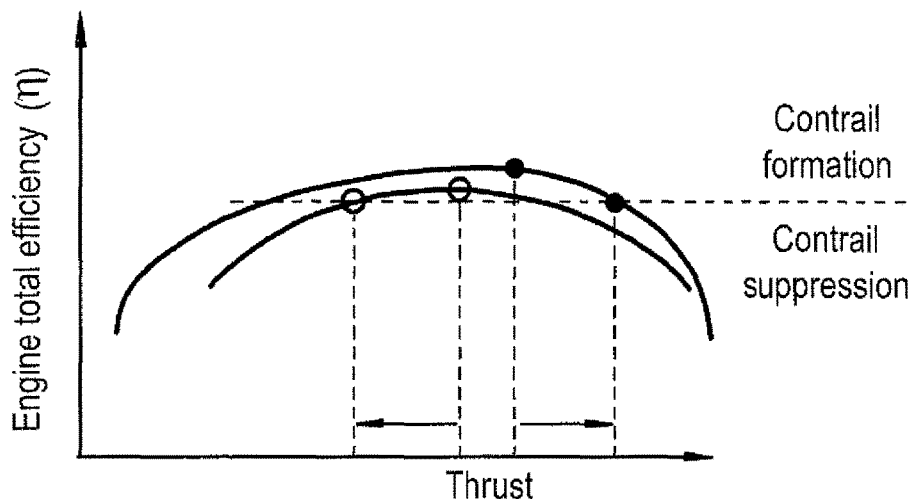
FIG. 9 shows a further schematic plot of engine efficiency against thrust for use in determining engine thrust settings.
Figure 10:
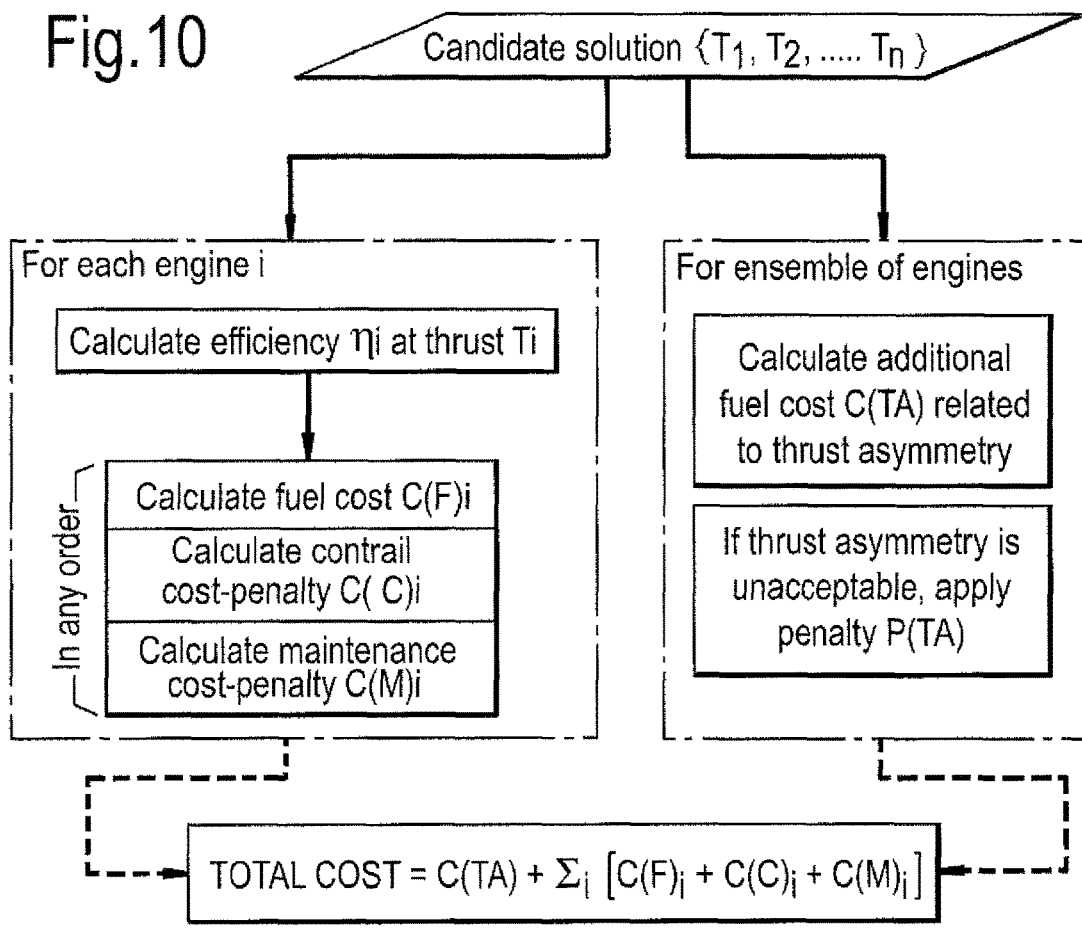
FIG. 10 shows a an example scheme for determining an operational cost value associated with a proposed partitioning between the plurality of engines of the aircraft total thrust requirement.

In FIGS. 7 and 8, it is assumed that the efficiency plot forms a generally symmetrical arc about its optimal efficiency point and that the plot is identical for each engine. However in FIG. 9, it is acknowledged that a true plot for any engine may be non-symmetrical and/or that plots for different engines may be different. Two plots are shown in FIG. 9 but this could extend to all engines on the aircraft. Thus one engine may already be non-optimal at cruise whilst another engine is at a thrust level corresponding to optimal efficiency for that engine. In such a scenario, rather than dividing engines into subsets, the engines may all be accommodated and controlled individually, such that the sum total of the thrust contributions will equal the thrust demand but each engine may have a distinct thrust setting.

The different scenarios of use described above may result from how the correlation between efficiency and thrust/throttle is determined for use with the invention. For example individual correlations/plots could be determined using current sensor readings or data collated from one or more previous flights. Alternatively a standard fixed correlation may be used for an engine type, whereby all engines would have a corresponding efficiency/thrust profile. Alternatively, a standard/predetermined correlation may provide a starting point but other engine operation data (e.g. engine health-monitoring (EHM) data) may be used to determine a deviation from the standard correlation for each engine. For example, such a calculation could refer to turbine gas temperature (TGT) margin, pressure readings or other data which can be used to indicate the extent to which the engine's actual fuel-efficiency plot deviates from some known reference plot.

In view of the above-identified need to determine desirous thrust settings for a plurality of engines in a number of potential scenarios, it is proposed to initiate a multi-dimensional search by the controller 30 in order to investigate the potential solutions and select an optimal or acceptable solution from the available search space. Within this search problem, contrail formation may be represented as an environmental cost (indicative of the extent of climate warming impact associated with the contrail, taking account of persistence, day vs. night, and any other climate impacting factors) which is then combined with, e.g. added to, an operational cost (e.g. fuel burn, potentially including other sources of operational cost, e.g. maintenance) within the search process in order to determine the optimal balance. The sum of those cost elements may provide an aggregate cost for the solution which can be compared against other potential solutions.

The calculation of the best (i.e. lowest-cost) distribution of thrust is thus determined by a suitable optimisation algorithm. The search takes place within a search space, each point of which represents a proposed distribution of the total thrust requirement across the currently operative engines. The scope of the search may be limited by the difference between the current engine thrust and the maximum engine thrust and/or any other limiting factor disclosed herein. The search process consists of the following stages:

Establish the limits (both upper and lower) of the thrust range that can be explored for each engine, taking account of the thrust capability of each engine and other operability constraints And then, repeatedly:

Propose a particular distribution of thrusts which sums to the desired total thrust Evaluate the cost associated with the proposed thrust distribution, taking account of a number of factors as set out below.

Keep a record of the lowest-cost thrust distribution found so far.

The search may be stopped when any or any combination of: a pre-determined time-limit is reached; a pre-determined limit on the number of trial-solutions to be explored is reached; and/or a lowest-cost thrust distribution found so far has not been bettered for a number of iterations, and it is thus believed to be the optimum.

If, as a result of the above search process, an acceptable solution has been found, the control system then implements the engine throttle settings which will result in the identified thrust settings, by modifying the cockpit-commanded throttle signals (item 51 in FIG. 1) and outputting the modified throttle signals 35 to the engine controllers 11. If no acceptable solution was found, then engine thrusts are left unaltered from the level commanded from the cockpit, in which case the throttle signals 35 will be identical to the throttle signals 51.

The repeated steps of the search process described above are performed by the optimisation algorithm, which may be achieved by defining the constrained search problem as an (n−1) dimensional search, where n is the number of engines over which the aircraft total thrust requirement must be distributed. A number of conventional optimisation algorithms for other, or general-purpose, applications may be employed here.

A particular working example of the cost evaluation stage for the search, described above, is shown in FIG. 10 and the steps described as follows:
I. For each engine, which in the current proposed thrust distribution is assigned a thrust level $T_i$, calculate the engine total efficiency which the proposed thrust $T_i$ will entail.
II. Also for each engine, calculate in any order:
The fuel cost
The cost of any contrails that may be formed
Any additional maintenance costs (or benefits) introduced by running the engine at a non-normal thrust level
III. For the plurality of engines as a whole, consider the fuel cost incurred to offset any thrust asymmetry introduced by the proposed thrust distribution, and apply a penalty if the level of thrust asymmetry exceeds a pre-determined limit.

The order of sub-steps II and III is not crucial. The calculation of costs may be done either on a per-unit-time basis or alternatively on a per-unit distance basis, provided that the same basis is adopted consistently across all the calculations.

In view of the above, it will be appreciated that an iterative search process is thus used to identify a desired thrust profile across the engines for contrail suppression.

The search process could converge on a solution by narrowing the field of search to the vicinity of successive improvements on previously attempted trial values. Alternatively, the search may be attempted across the whole of the available search space at successive timings, e.g. at fixed time intervals. It is envisaged that the search could be performed theoretically/mathematically and the result implemented. However, in other examples, the search could be conducted by concurrently varying the thrust for the plurality of engines, or a subset thereof, and monitoring the impact on contrail formation by one or more suitable contrail detection sensor for each of the engines.

Figure 11A:
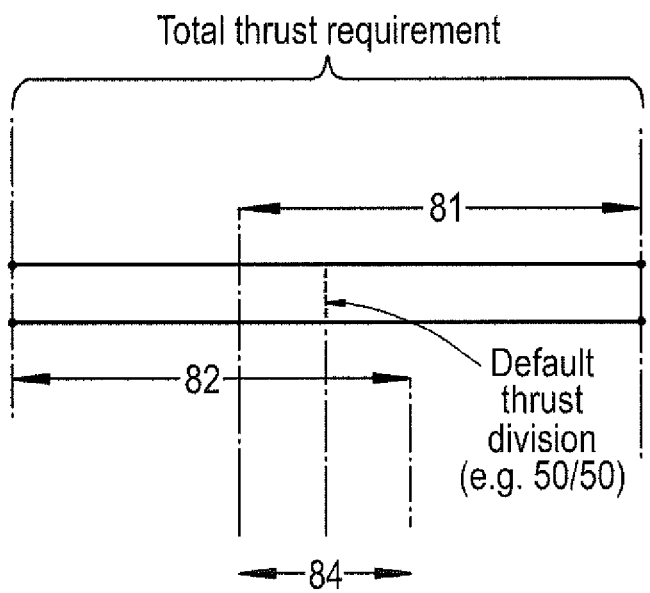
FIGS. 11a and 11b show two schematic examples of search regions to be explored by a controller in accordance with an example of the invention.
Figure 11B:
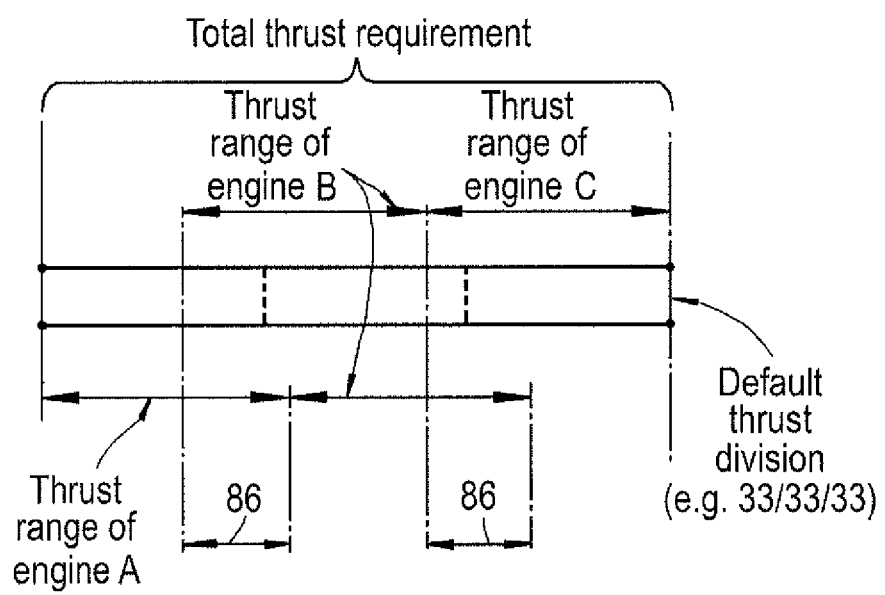

FIGS. 11a and 11b illustrate another method for identifying search regions that could be explored, taking account of the ranges of thrust that can be achieved by each of the installed engines. The range of thrust available to each engine may thus be represented by a width dimension of a column, the aircraft having 'n' engines, denoting 'n' columns, wherein the search is performed by iterative adjustment of n−1 column boundaries so as to divide a fixed width of the search space, each column being individually subject to a maximum width limit and a minimum width limit.

In FIG. 11a, the column width 81 represents a thrust range of a first engine and the width 82 represents the thrust range for the other engine of a twin-engined aircraft. In the example of FIG. 11a, the optimal value for only one variable (namely the position of one column boundary in the analogy) is to be determined and a simple search/sweep through the region of overlap 84 need be performed.

FIG. 11b represents a three-engine scenario, in which the combined regions of overlap 86 to be explored increase complexity. In the general case, as with the other examples given above, there is defined an n−1 dimensional search, where n is the number of engines.

Figure 2:
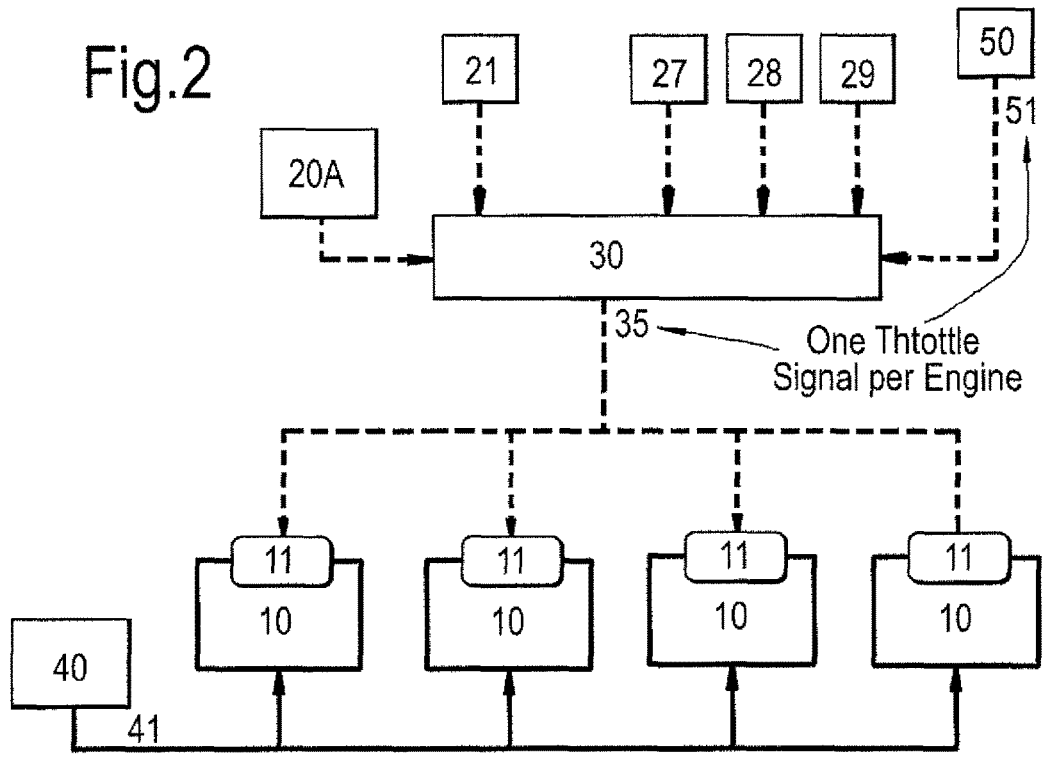
FIG. 2 is a diagrammatic representation of a control system according to a second example of the invention.
Figure 3:
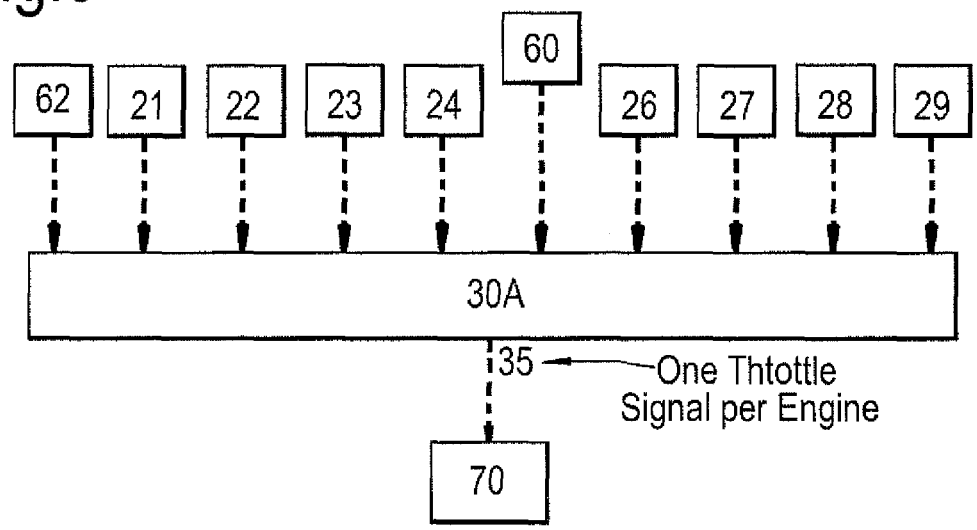
FIG. 3 is a diagrammatic representation of a ground based thrust determination system according to a third example of the invention.
Figure 4:
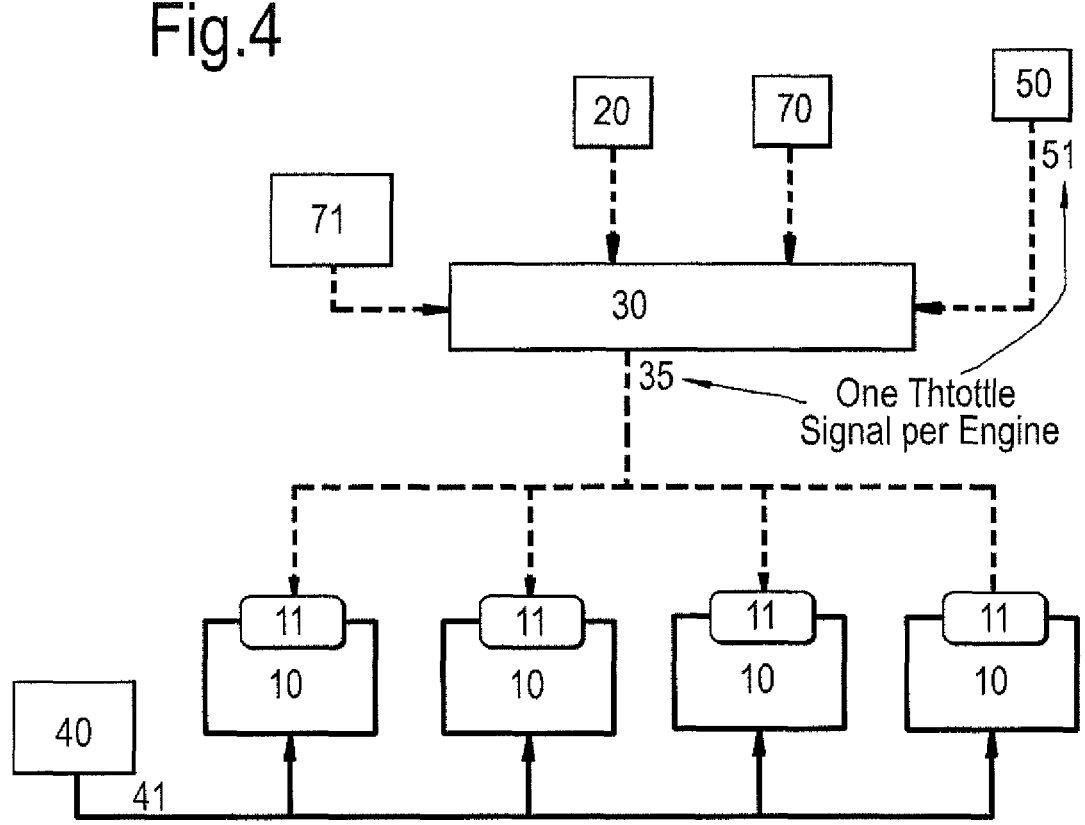
FIG. 4 is a diagrammatic representation of an aircraft-based control system according to the third example of the invention.

With reference to FIGS. 2-4, a number of alternative embodiments of the above proposed system are shown.

In the embodiment of FIG. 2, like numerals are used for like features. However the use of contrail detection sensors (typically at least one per engine) 20A of the type described above instead of ambient condition sensors to identify contrails as they form, allows a number of the system features (such as data inputs 20, 22, 23, 24, 25 and 26) to be removed or used optionally. The controller 30 may thus operate substantially as described above but with less burden to identify the likelihood of a contrail forming scenario, and instead reacting to actual contrail formation.

This alternative approach eliminates a great deal of complexity and requirement for data (relative to the primary embodiment), but it does introduce a potential delay if it is required to evaluate each trial solution by controlling thrust levels and observing the results. Accordingly it may be possible to divide the search process into two search phases. A pre-search or coarse search may be used to identify the most promising parts of the search space and directs the search to that region or regions, in order that fewer search points are explored before a suitable solution is found. A second search phase (i.e. an optimisation or fine search) may be implemented over a limited search region identified by the first search. The fine search may help to avoid undue cycling of an engine's thrust level over a wide range.

Such a two-stage search strategy may be used for any example of the invention defined herein, for example where a first search phase may be performed analytically/mathematically and a second search phase may be performed by controlling trial throttle/thrust values on a plurality of engines and selecting the optimal (lowest cost or highest efficiency) thrust values found.

Turning to FIGS. 3 and 4, another potential implementation of the invention is shown, which accommodates the calculation of likely/potential thrust distributions in advance of the flight, perhaps using a ground based facility that performs such calculations for all flights within a managed fleet. The calculated thrust distributions are uploaded to the aircraft/engine controller, for example in the form of a lookup table or script which details for each stage of the flight what the thrust distribution should be. FIG. 3 shows the system for performing a pre-flight thrust distribution calculation.

Item 60 is a data source or store comprising details of the aircraft's proposed routing, specifying a sequence of spatial positions (e.g. expressed in 3 dimensions, such as latitude, longitude, altitude) and the absolute time, or time delay after the start of the flight, at which each of those spatial positions will be reached.

Item 62 is a source of meteorological forecast data from which can be obtained predicted values of ambient air properties (temperature, pressure, humidity) at each of the points through which the aircraft will travel on its proposed route, taking account of the absolute time, or time delay after the start of the flight, at which each point will be reached, according to the schedule set out in 60.

Like numerals define features substantially as described above in relation to FIG. 1. In this example, the predictive decision making unit 30A carries out the following steps:

Using the proposed routing information in conjunction with forecast meteorological data and knowledge of the characteristics of engines and aircraft, all the "change-points" in the proposed flight or a portion thereof (e.g. such as during cruise only) are identified. Change-points could include transitions into/out-of contrail forming conditions; transitions into/out-of ice-supersaturated air, changes in the thrust settings required to adhere to the proposed routing etc. The change-points are used to divide the flight or flight phase into sections.

Then, for each section the desired thrust/throttle distribution is calculated using any or any combination of the methods described above. The results are stored as the database or lookup-table or script 70, comprising the modified throttle settings 35; the corresponding time/aircraft position at the commencement of the section (used as a retrieval key); the expected default throttle settings appropriate to that section; the forecast ambient conditions (temperature, pressure, humidity) that were used as the basis of calculation for this section. The output 70 is communicated to the aircraft in readiness for the flight.

FIG. 4 shows the on-board control system, again using like numerals for like features described above. In place of a number of data inputs required for the embodiment of FIG. 1, the controller 30 makes use of input 70 and input 71, which represents a real-time feed of the aircraft position and/or current time or flight duration. If the flight proceeds according to schedule and forecast conditions, the controller 30 simply implements control instructions 70. If deviations to the flight time/duration occur, the controller 30 may simply offset the control instruction to the appropriate flight time or aircraft location.

If any significant deviation to the flight route or ambient conditions occurs, the aircraft may implement normal engine control from thrust demands dictated by the cockpit. Otherwise the controller may switch to on-board determination of suitable thrust distribution using the methods of FIG. 1 or 2. Thus examples of the invention may accommodate a partial initial search or solution determined in advance of the control instructions being implemented (e.g. prior to a flight), whilst allowing a partial or complete search or solution to be performed in real time by the engine controller.

The at-least partial initial co-ordination at fleet level (i.e. for a plurality of aircraft) may beneficially allow fuel and/or other resource planning across a fleet. It may also allow tailoring of a contrail suppression policy to be implemented or amended centrally. Thus any or any combination of the examples of FIGS. 1 to 4 and/or two-part search strategy may be implemented depending on the needs of particular aircraft operators.

An assessment can be performed of the extent of contrail suppression effect achievable by degrading engine efficiency by, say 4% or 5% using the invention. A contrail "critical temperature" (i.e. the ambient air temperature below which a contrail can form for a given level of ambient humidity and engine total efficiency) will vary with altitude and can be plotted on a graph of altitude against temperature. An engine with a total efficiency value of around 0.36 is typical of current large civil gas turbines and if a corresponding calculation of contrail critical temperature is performed at the degraded engine efficiency according to the invention, then the degraded engine efficiency will correspond to lower critical temperatures, meaning that ambient air must be colder if a contrail is to form, and thus contrail formation is possible over a reduced range of altitudes.

A mathematical analysis of the implementation of the invention suggests that a 4% degradation of efficiency could reduce the extent of the contrail-formation altitude-band by a few hundred feet, with a greater shift at the upper altitude boundary (if it lies in the stratosphere) for contrail formation than the lower boundary (within the troposphere). The effect is more pronounced in the stratosphere because the rate of temperature change with altitude, i.e. the lapse rate, there is effectively zero.

In view of such an analysis, it will be appreciated that the present invention does not provide a complete solution to contrail suppression in that it cannot inhibit contrail formation at all altitudes but it can limit the region in which contrails will occur. The additional contrail-free sky, which is divided into two altitude bands, is of particular use if one of those altitude bands straddles the aircraft's current altitude or else is so close to a current altitude that it can be achieved without significant detriment. The present invention may focus particularly on the avoidance of contrail formation in regions of ice-super-saturated (ISS) air. On average, aircraft cruise in ISS air for only a small proportion of their total flying time, and so the proportion of the flight during which a contrail suppression mechanism needs to be active in order to mitigate against a majority of the negative climate impact of contrail formation is relatively small.

It is envisaged that the invention may usefully be employed to provide a partial contrail suppression solution, making use of existing engine systems. A key advantage of the present invention is that it does not require complex equipment or modification of a conventional gas turbine engine design, nor does it increase the weight of the engine. Thus the invention may also be used in conjunction with other techniques or systems for contrail mitigation. For example, the invention may reduce the number of instances in which an aircraft may need to be redirected to avoid contrail formation and/or may reduce the distance/altitude by which an aircraft's route may need to be adjusted. Additionally or alternatively the invention may be used in conjunction with one or more further contrail suppression system, for example allowing extra contrail-suppression capability when other methods have reached their own limits.

Since the invention relies on the deliberate reduction of engine efficiency, it will introduce an increased fuel-burn. However this penalty is directly linked to the change to engine efficiency when the contrail suppression is active and is incurred only for a small proportion of the flight. Thus the increased fuel burn is easily predicted and less severe than it might initially appear to the skilled person. From a climate-change perspective, the reduction in climate warming impact achieved through contrail suppression can be tailored through the control methods discussed above to outweigh the increased $CO_2$ or other exhaust emissions resulting from this invention's operation.

In various examples of the present invention, it is considered pertinent to disable the contrail suppression system during one or more flight phase, such as during take-off, climb-out and/or approach, where emergency situations may demand that more thrust is commanded quickly, whilst still maintaining engine operation within acceptable ranges of temperature and shaft-speeds.

Usage of the contrail suppression system may additionally or alternatively be disabled if the additional volume of fuel required for its operation would jeopardise the safe completion of the flight to the intended destination, taking account also of the requirement to maintain fuel reserves e.g. for holding, diversions and go-arounds. Accordingly, in some examples of the invention, it may be beneficial to calculate or estimate the total amount of fuel required for the flight, taking account of potential/expected contrail suppression requirements. In any such example a proposed flight may be divided into a number of sections, each corresponding to an engine operating condition. From the contrail suppression prediction for each flight section is determined the amount of additional fuel necessary to fulfil that contrail suppression requirement for that operating condition, taking account of expected thrust level and duration of the operating condition. A summation over the various operating conditions/flight sections can then be performed to provide the total mass or volume of additional fuel which should be loaded onto the aircraft prior to the flight. A simpler metric could be applied based on flight duration and proposed cruise altitude.

It may also be necessary to monitor fuel burn against a predicted fuel burn for the flight or each section thereof to ensure that there is at all times sufficient fuel remaining to complete the flight whilst maintaining the necessary reserves as described above. Accordingly, a minimum fuel threshold level, below which contrail suppression cannot be implemented for the flight or a particular section thereof may be determined in advance and/or monitored dynamically in flight. A dynamic threshold fuel level would have a high value at the beginning of a flight and would reduce as the flight progresses to reflect the fuel requirement for the remainder of the flight.

Whilst the above examples of the invention relate to control of a throttle setting for each engine to control thrust, it will be understood that the precise operational variable for the engine that is used as an indicator or setting of thrust/throttle may vary between different implementations of the invention. For example, conventional throttle levers in the cockpit may be used to determine the thrust/throttle demand for each engine from the cockpit. However the actual sensing and/or control of a thrust setting will typically be implemented using one or more operational variable for the engine, which is indicative of a thrust setting. The operational variable could comprise any or any combination of: fuel flow rate to an engine; an engine shaft rotational speed, such as low-pressure shaft speed; and/or a pressure ratio between different locations with respect to the engine or a portion thereof. A number of other possible operational variables could potentially be used as a proxy for thrust/throttle when implementing the invention and the terms "thrust" or "throttle" as used herein should be construed accordingly.

The invention claimed is:

1. A method of controlling a plurality of gas turbine engines of an aircraft, the method comprising:
    sensing a condition indicative of vapour trail formation by an exhaust flow from one or more of the engines using one or more sensor;
    responding to a thrust demand for the aircraft by individually controlling a thrust produced by each of the engines so as to alter an efficiency of one or more of the engines upon sensing of the condition by the one or more sensor and thereby suppress formation of a vapour trail by one or more of the plurality of engines:
    controlling, by a controller, one or more engines to generate a different level of thrust to one or more further engines concurrently;
    determining, by the controller, a maximum available variation in thrust value or engine efficiency available for each of the plurality of engines, and an efficiency value required to suppress contrail formation: and
    selectively altering, by the controller, thrust levels of the plurality of engines only when contrail suppression is determined to be achieved within the maximum available variation.

2. The method of controlling a plurality of gas turbines according to claim 1, wherein the engines have a normal or optimal engine thrust setting and the controller controls at least one engine to produce a level of thrust that is greater than the normal or optimal engine thrust setting and at least one further engine to produce a level of thrust that is less than the normal or optimal engine thrust setting.

3. The method of controlling a plurality of gas turbines according to claim 1, wherein the controller controls the plurality of engines such that a total thrust produced by the plurality of engines equals an aircraft thrust demand, wherein the one or more engines contributes a different proportion to the total thrust from the one or more further engines.

4. The method of controlling a plurality of gas turbines according to claim 1, wherein the controller controls a throttle setting for each engine, the controller receives a thrust demand including a throttle setting from an aircraft control system and selectively modifies the throttle setting for each engine, the controller outputting a plurality of throttle setting control signals corresponding to the plurality of engines.

5. The method of controlling a plurality of gas turbines according to claim 1, wherein the controller applies a thrust asymmetry threshold and varies the thrust produced by each engine such that a thrust asymmetry arising from a thrust contribution by one or more engines on opposing sides of a central axis of the aircraft is within the thrust asymmetry threshold.

6. The method of controlling a plurality of gas turbines according to claim 1, wherein the controller determines one or more thrust value for the plurality of engines by accessing one or more engine efficiency models.

7. The method of controlling, a plurality of gas turbines according to claim 6, wherein the controller determines an available range of thrust values or a proposed change in current thrust value for any combination for all of the plurality of engines with reference to the one or more engine efficiency models.

8. The method of controlling a plurality of gas turbines according to claim 6, wherein a separate engine efficiency model is provided for each engine.

9. The method of controlling a plurality of gas turbines according to claim 1, wherein the controller applies a search process to identify a value of thrust for each of the engines which satisfies both an aircraft thrust demand and a threshold value of a contrail characteristic.

10. The method of controlling a plurality of gas turbines according to claim 9, wherein the search process includes an initial search phase and a second search phase performed after the initial search phase, the second search phase searches for a value of thrust for each of the engines which satisfies both the aircraft thrust demand and the threshold value of a contrail characteristic dependent on one or more current operating condition.

11. An aircraft propulsion control system comprising:
a plurality of gas turbine engines;
one or more sensor arranged to sense a condition indicative of vapour trail formation by an exhaust flow from one or more of the plurality of engines; and
a controller arranged to:
be responsive to a thrust demand for an aircraft and to control thrust produced by each of the engines so as to alter an efficiency of one or more of the engines upon sensing, of the condition by the one or more sensor:
control one or more engines to generate a different level of thrust to one or more further engines concurrently:
determine a maximum available variation in thrust value or engine efficiency available for each of the plurality of engines, and an efficiency value required to suppress contrail formation: and
selectively alter thrust levels of the plurality of engines only s heir contrail suppression is determined to be achieved within the maximum available variation.

12. An aircraft propulsion control system according to claim 11, wherein the engines have a normal or optimal engine thrust setting and the controller controls at least one engine to produce a level of thrust that is greater than the normal or optimal engine thrust setting and at least one further engine to produce a level of thrust that is less than the normal or optimal engine thrust setting and such that a total thrust produced by the plurality of engines equals the aircraft thrust demand, the one or more engines contributes a different proportion to the total thrust from the one or more further engines.

13. A non-transitory data carrier comprising machine readable instructions for operation of a controller for a plurality of gas turbine engines to:
receive a sensor output from one or more sensor:
determine whether or not the output is indicative of a vapour trail formation condition by an exhaust flow from one or more of the engines:
responsive to a thrust demand for an aircraft to control a thrust produced by each of the engines so as to alter an efficiency of one or more of the engines upon sensing of the vapour trail formation condition by the one or more sensor and thereby suppress a formation of a vapour trail by one or more of the plurality of engines:
control one or more engines to generate a different level of thrust to one or more further engines concurrently:
determine a maximum available variation in thrust value or engine efficiency available for each of the plurality of engines, and an efficiency value required to suppress contrail formation: and
selectively alter thrust levels of the plurality of engines only when contrail suppression is determined to be achieved within the maximum available variation.

* * * * *